(12) United States Patent  (10) Patent No.: US 7,547,372 B1
Sloan                      (45) Date of Patent:     Jun. 16, 2009

(54) THERMALLY REACTIVE INK TRANSFER SYSTEM

(76) Inventor: Donald D. Sloan, 17750 Elm Grove Rd., Platte City, MO (US) 64079

( * ) Notice: Subject to any disclaimer, the term of this patent is extended or adjusted under 35 U.S.C. 154(b) by 0 days.

(21) Appl. No.: 11/558,009

(22) Filed: Nov. 9, 2006

Related U.S. Application Data (63) Continuation of application No. 11/053,542, filed on Feb. 8, 2005.

(51) Int. Cl.
*B29C 65/02* (2006.01)
*B29C 65/72* (2006.01)
*B32B 37/06* (2006.01)
*B32B 37/24* (2006.01)
*B32B 37/26* (2006.01)
*B32B 38/16* (2006.01)
B29C 65/34 (2006.01)
B32B 37/10 (2006.01)
B32B 38/10 (2006.01)
B32B 38/18 (2006.01)

(52) U.S. Cl. ............... 156/241; 156/212; 156/229; 156/230; 156/247; 156/289; 156/297; 156/299

(58) Field of Classification Search ........ 156/230, 156/241, 247, 249, 289, 297, 299, 212, 229
See application file for complete search history.

(56) References Cited

U.S. PATENT DOCUMENTS

| | | | |
|---|---|---|---|
| 3,826,701 A * | 7/1974 | Miller | 156/359 |
| 3,826,706 A * | 7/1974 | Miller | 156/359 |
| 4,560,587 A | 12/1985 | Sasaki | |
| 4,770,732 A | 9/1988 | Steelman | |
| 5,032,449 A * | 7/1991 | af Strom | 428/195.1 |
| 5,203,941 A * | 4/1993 | Spain et al. | 156/209 |
| 5,560,796 A | 10/1996 | Yoshimura | |
| 5,851,614 A | 12/1998 | Buck | |
| 6,346,312 B1 * | 2/2002 | Billoni | 428/195.1 |
| 6,467,893 B1 | 10/2002 | Matsumoto et al. | |
| 6,641,257 B1 | 11/2003 | Shi et al. | |
| 6,642,343 B2 | 11/2003 | Gilles et al. | |
| 6,734,273 B2 | 5/2004 | Onder | |
| 6,743,109 B2 * | 6/2004 | Kammerer et al. | 473/125 |
| 6,797,748 B2 | 9/2004 | Chen et al. | |
| 6,964,722 B2 * | 11/2005 | Taylor et al. | 156/230 |
| 2004/0026020 A1 * | 2/2004 | Kasperchik et al. | 156/230 |
| 2004/0161566 A1 | 8/2004 | Truog et al. | |
| 2004/0161567 A1 | 8/2004 | Truog et al. | |
| 2005/0176524 A1 | 8/2005 | Sullivan et al. | |

OTHER PUBLICATIONS

Solutia: Additives for Liquid Coatings; 1/Sep. 28, 2000.
Surface Specialities; ADDITOL VXL 6383; Technical Datasheet; 1.0/Sep. 28, 2002.

(Continued)

*Primary Examiner*—Philip C Tucker
*Assistant Examiner*—Sonya Mazumdar
(74) *Attorney, Agent, or Firm*—Hovey Williams LLP (57) ABSTRACT

An ink transfer system including an ink transfer decal that is transferable to a final substrate, such as a bare metal or pre-painted autobody part, without use of a separate adhesive. The transferred ink decal is capable of withstanding temperature elevations common during automotive paint baking without significant thermal degradation, discoloration, shrinkage or pealing.

27 Claims, 5 Drawing Sheets

OTHER PUBLICATIONS

Chiba Specialty Chemicals; TINUVIN 123; Sep. 5. 2000.
Chiba Specialty Chemicals; Tinuvin 400; Nov. 5, 1998.
CIBA; Irganox 1010; Antioxidant and Thermal Stabilizer.
CIBA-GEIGY; Tinuvin 1130: Liquid Ultraviolet Light Absorber for Coatings; 1991.
CIBA-GEIGY: Irganox 1035 Antioxidant and Thermal Stabilizer; 1989.

* cited by examiner

THERMALLY REACTIVE INK TRANSFER SYSTEM

RELATED APPLICATION

The present application is a Continuation Application of patent application Ser. No. 11/053,542, filed Feb. 8, 2005, incorporated by reference herein.

BACKGROUND OF THE INVENTION

This invention relates to methods of transferring paint or ink to solid surfaces and more particularly to a method of transferring a substantially solid ink layer to a surface without the use of a separately applied adhesive.

In the vehicle manufacturing industry, painted or inked designs are typically applied through application of liquid paint to the surface of a body element, such as a fender or hood. An example of this type of application is pinstriping. Manual application of stripes or designs requires artistic skill, even if the process is augmented through use of stencils or tape. Airbrushed designs are very labor intensive and require considerable skill.

One prior art method of automating the application of designs or stripes is the use of adhesive decals. A decal is created by applying ink to a plastic film bearing adhesive on the opposite surface. The adhesive side of the decal may then be applied to the desired surface. Further protection may be achieved by applying a clear, protective, thermoset or photoset coating over the surface to seal the decal against the elements.

These prior art decals have very limited elongation properties and are difficult to apply to highly curved, edged or contoured surfaces. Further problems with prior art decals include separation of the decal from the substrate surface due to failure of the adhesive, and shrinkage, peeling and cracking of the decal itself over time. In addition, the decal typically presents a raised surface that can be felt and observed even after application of a clear coat. The raised decal detracts from the overall appearance and makes the decal prone to increased abrasion, chipping and peeling. Edges of prior art decals are prone to curl after exposure to heat during baking of a thermoset clear coat.

BRIEF DESCRIPTION OF THE INVENTION

The present invention presents an ink transfer system including a decal that may be subjected to high temperatures and UV radiation. The decal is provided as an alternative to hand painted detail trim for vehicles and accessories such as automobiles, motorcycles, boats, boat motors and helmets. The decal may be applied to various metallic, plastic or painted surfaces and is particularly advantageous when applied to pre-painted metal structures that are subjected to baking in order to cure overlying thermoset clear coats.

An ink transfer system according to the present invention may include one or more layers of temperature and UV resistant ink deposited upon a backing sheet by screening or other currently known or later developed techniques. If a waterslide decal is desired, the ink may be deposited upon waterslide decal paper having a water soluble coating. A transfer medium is deposited over the ink to aid in transfer of the ink to a final receiving substrate. Because the ink is typically deposited upon the backing sheet to form a thin film, the transfer medium aids transfer of the decal from the backing sheet to the substrate without wrinkling or damaging the decal. The transfer medium may be applied over the ink layer through screen printing and it becomes an integral part of the transfer system. Because the transfer medium is designed not to bond to the ink, it is removed prior to application of a subsequent coating such as a clear coat.

The decal exhibits high flexibility and elongation and may be applied over contoured surfaces. Alternatively, the decal may be applied to a flat surface that is later bent, stamped or otherwise shaped.

Antioxidants and UV absorbers/light stabilizers are added to the base resin to enhance heat and light stability and to increase tackiness and plasticity of the ink, particularly during heat curing of an overlying clear coat material as is often the case in automotive applications. Although the decal is solid once formed, the ink comprising the decal adheres particularly well to metal and most painted and plastic surfaces due to the low molecular weight polymers comprising the base resin (polymer vehicle). The addition of the antioxidants tends to suppress polymerization enhancing the ability of the polymer vehicle to migrate into the adjacent substrate and form a tight bond. The decal therefore provides a means for transferring solid ink to a substrate without the need for a separate, intervening adhesive layer. When applied to a pre-painted surface, the decal adheres to and binds with the underlying paint to form a uniform coating. Due to the thin layers of ink used to form the decal, the margins of the decal do not noticeably project above the substrate surface and are therefore unlikely to chip or peel, particularly if covered with a clear coating.

Other advantages of the invention will become apparent from the following description taken in connection with the accompanying drawings, wherein is set forth by way of illustration and example, embodiments of the present invention.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

An ink transfer system according to the present invention provides for the application of liquid, polyurethane based inks onto a backing sheet to form an ink transfer decal. The decal is coated with a removable transfer medium. The resultant decal is solidified, typically through evaporation of diluents after application of each layer of liquid constituent. It may then be removed from the backing sheet and applied to a final substrate.

Through the use of low molecular weight aliphatic polymers and antioxidants for polymerization suppression, an ink is provided that upon heating (during baking of a subsequently applied clear coat) becomes plasticized and tacky thereby obviating the need for application or use of a separate adhesive between the decal and the substrate surface. Due to the migration of low molecular weight polymers into the substrate surface, the decal binds to the substrate surface. In the case of pre-painted surfaces, particularly those painted with polyurethane based paints, the decal essentially becomes part of the painted coating.

The provision of a decal comprising thin films of high opacity ink is highly beneficial as it enables rapid application of complex designs to substrate surfaces without the inefficiencies of hand painting while also avoiding problems related to prior art adhesive decals such as peeling from the substrate due to failure of the adhesive; degradation upon subjection to elevated temperatures during baking of an overcoat such as a clear coat or finish; peeling, cracking or curling due to shrinkage; and increased subjection to abrasion or separation from the substrate due to projection of the prior art decal above the substrate surface. The ink transfer system of the present invention avoids these disadvantages by providing a thin film decal that self-bonds or adheres to the substrate and does not perceptibly project above the substrate surface. Indeed, upon proper application of the decal and subsequent covering with a clear coat finish, no transition can typically be felt by touch or observed by the naked eye due to location of a decal of the present ink transfer system upon a typical substrate surface.

Decal Preparation

Figure 1:
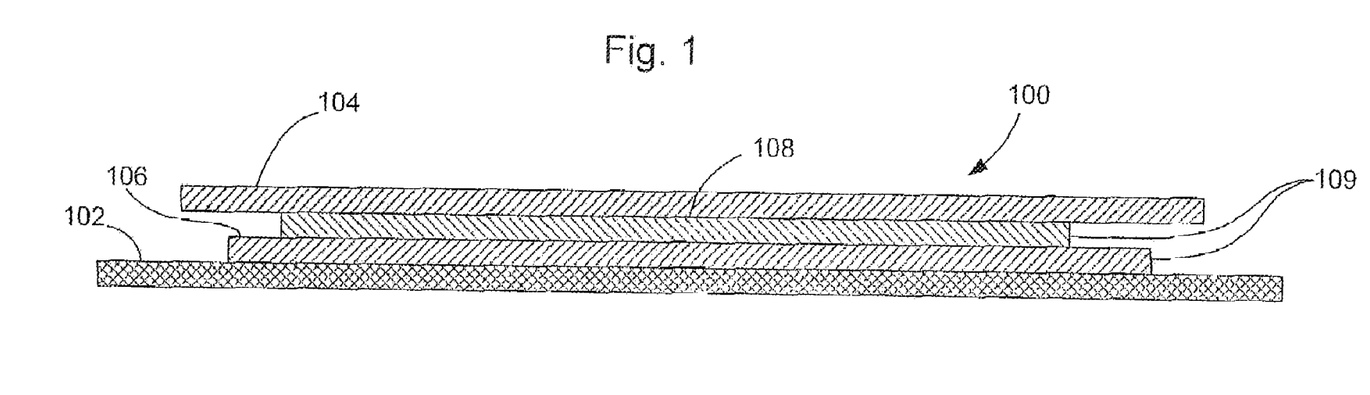
FIG. 1 is a diagrammatical cross sectional view of a decal formed in the manner described herein.

Referring now to the drawings, FIG. 1 illustrates a diagrammatical cross sectional view of a ink transfer system 100 formed in accordance with the present invention for application of solidified ink to a substrate 101 (see FIGS. 6-11), such as a painted automobile, motorcycle or boat body panel or similar surface. The thickness of the various components are exaggerated in FIGS. 1 and 2 to aid in illustration.

The ink transfer system 100 includes a backing sheet 102 and transfer medium 104 enclosing transparent base coat 106 and pigmented ink 108 layers, the latter two components comprising the ink transfer decal 109. The transfer medium 104 may also be referred to as a premask. The base coat 106 and ink 108 may be referred to herein collectively as ink, inks or ink layers since the base coat 106 is formulated with similar constituents as an ink and may be formulated generally as an unpigmented ink. In addition, the base coat 106 may comprise a pigmented ink if enhanced opacity is required. The primary constituents and formation of the ink transfer system 100 are as follows. The backing sheet 102 has an upper surface adapted for receiving solvent-based polymer inks 108 and base coats 106. An appropriate backing sheet 102 is formed of material that will accept the base coat 106 and ink 108 as they are screened upon the sheet 102 without reacting with the inks or softening under the influence of the ink or ink diluents such as organic solvents. The upper surface of the backing sheet 102 is typically provided with a thin coating of water soluble material that allows the decal 109 to be later transferred to a substrate 101 using a waterslide technique.

Typically, although not necessarily, a base coat 106 is screen printed onto the backing sheet 102 to form an initial layer or coat that helps hold subsequent layers of pigmented ink 108 in proper position to one another. If layers of ink are physically separated from one another, such as with spaced bands 108a, 108b and 108c of pinstriping as shown in FIG. 2, the base coat 106 provides a means for the individual bands 108a-108c to be joined to one another to form a single ink transfer decal 109.

After the base layer 106 is applied it is dried to evaporate diluents, typically organic solvents. Next, one or more layers of pigmented ink 108 are typically screened onto portions of the base layer 102. Typically, the pigmented ink 108 is applied so that a portion of the base coat 106 extends beyond the margins of the pigmented ink 108. If the substrate 101 to which the resulting decal 100 is to be transferred is dark in color, the base coat 106 may contain light-colored (such as white) pigment to provide an opaque, light background to enhance the brightness of overlying layers of colored ink 108.

After solvents or diluents have substantially evaporated from the ink layer or layers 108, a release coat or layer 110 may be applied to cover and extend beyond the margins of the ink 108 and base 106 layers. As with the base coat 106, the release coat 110 may be formulated generally as an unpigmented ink 108. In addition, a release agent may be added to the release coat 110 formulation to aid in the later separation of the transfer medium 104 from the decal 109.

Figure 2:
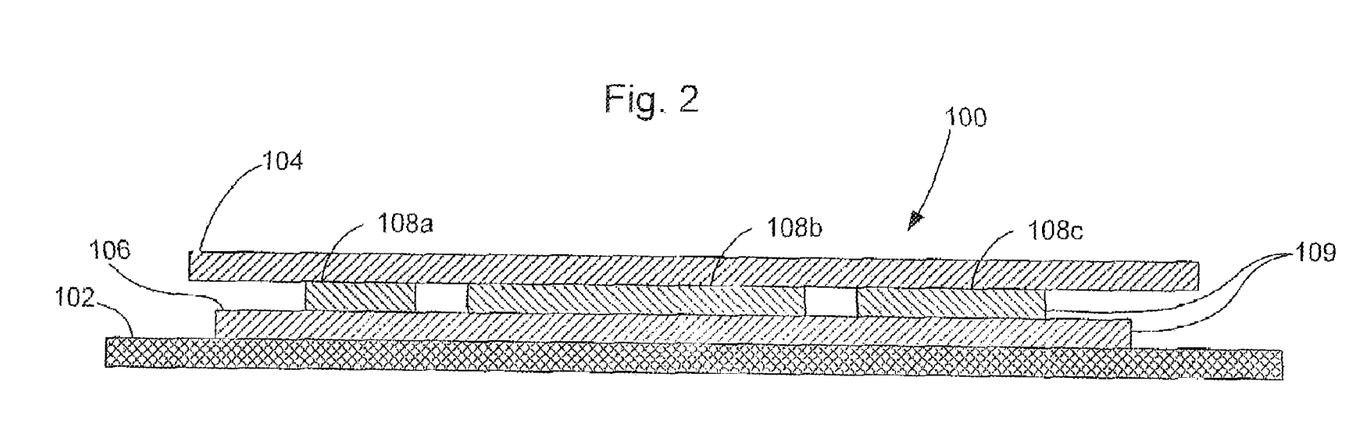
FIG. 2 is a diagrammatical cross sectional view of a decal formed in the manner described herein.
Figure 3:
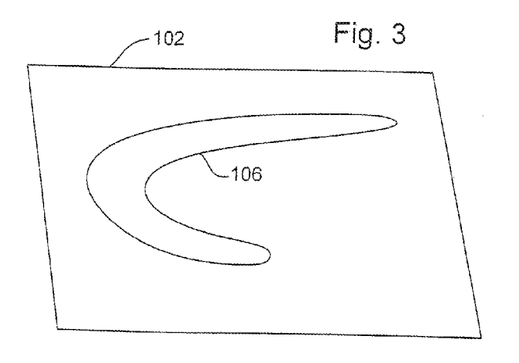
FIG. 3 is a top perspective view of a base coat applied to a backing sheet.
Figure 4:
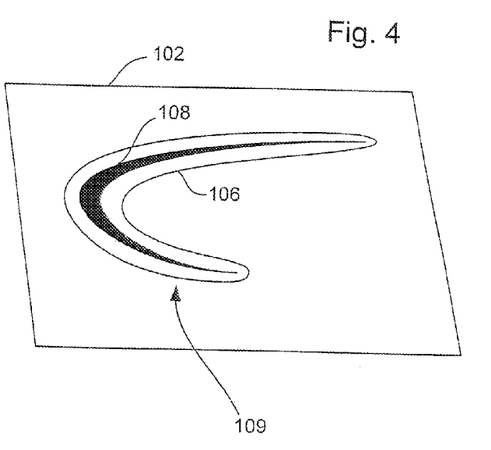
FIG. 4 is a top perspective view of an inked design applied over a portion of the base coat.
Figure 5:
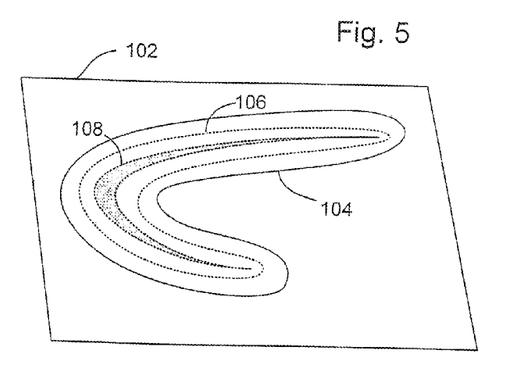
FIG. 5 is a top perspective view of a layer of transfer medium applied to, and extending past the margins of, the inked design and base layer.
Figure 12:
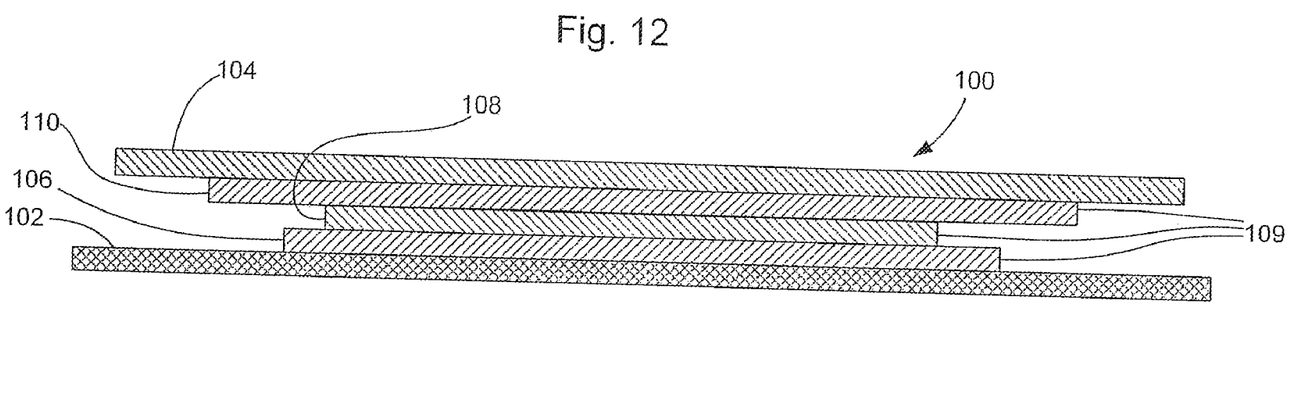
FIG. 12 is a diagrammatical cross sectional view of a decal formed in the manner described herein.

After solvents or diluents have substantially evaporated from each previous layer or coat, the transfer medium 104 may be applied over the base coat 106, ink layers 108 and release coat or layer 110 (see FIGS. 1, 2 and 12). The transfer medium 104 is typically applied so that it extends beyond the margins of the base layer 106, ink layer 108 and release coat 110. The transfer medium 104 is typically a clear, flexible coating that protects the decal 109 during storage and greatly aids the dimensional stability of the decal 109 during transfer to a substrate 101 while still allowing sufficient flexion and elongation of the decal 109 for application over, and conformation to, irregularly shaped substrate surfaces. As with the previously applied ink 108, base 106 and release 110 layers, the transfer medium 104 may be applied by screen printing, rolling, spraying or other currently known or later developed techniques. A coarser mesh may be used when screen printing the transfer medium 104 in order to deposit a somewhat thicker layer than was deposited when screen printing the base coat 106 and ink layer 108. FIGS. 1 and 2 illustrate the transfer medium 104 applied directly over the ink 108 and base 106 layers. FIG. 12 illustrates a release layer 110 disposed between the ink layer 108 and transfer medium 104. It should be appreciated that FIGS. 1, 2 and 12 are diagrammatical to show succession of component layers and do not reflect relative dimensions of components, particularly vertical dimensions or thickness. In addition, it should be appreciated that the component layers are applied successively as liquids and therefore conform closely to the underlying surfaces. For example, voids shown between spaced bands of ink 108a, 108b and 108c would in fact be filled by the transfer medium 104 and the portions of the transfer medium 104 extending beyond the ink 108 and base coat 106 layers would conform to exposed portions of the base coat 106 and backing sheet 102, respectively.

After screen printing, the transfer medium 104 is dried to evaporate solvents after which point the ink transfer system 100 has been formed and may be stored until required for transfer of the decal 109 to a substrate 101. At each stage of solvent evaporation discussed above, the decal 109 and transfer medium 104 may be dried, for example, by passing the system 100 through a wicket drier or by inserting it into a drying rack. Drying for one to two hours is typically optimal but decals 109 may be produced with reduced dry times particularly if the decal 109 is exposed to increased air flow and mild heat such as with a blow dryer held approximately six inches from the decal surface.

Any of the ink or base coat layers 108 and 106 may be transparent, translucent or opaque, however, the base coat 106 is typically transparent unless subsequent coats of ink 108 require an opaque underlying layer to allow the pigment of the ink 108 to more readily show against the color of the substrate. For example, if the decal 109 is to be transferred to a dark colored substrate, a white or otherwise light-colored base coat 106 may be desired so that the coloration of subsequent coats of pigmented ink 108 may be more apparent.

Decal Formulations

The following examples are provided to further disclose the invention. In these examples as well as throughout the specification and in the claims, unless otherwise indicated, all parts and percentages are by weight. The constituents of the ink 108 and base coat 106 formulas are selected to provide improvements on the prior art such as heat resistance, chemical resistance, resistance to degradation due to exposure to light (particularly ultraviolet light), high flexibility and elongation characteristics, high tack (particularly during baking after transfer to a substrate) and self-adhesion.

In the first column in each table the components are identified. The next column provides the percent by weight of each component as a constituent of the example formulation. The third column provides approximate percent ranges for each component. These percent ranges do not represent limits for each component but are included as indicative of preferable amounts. Should one or more components be substituted with an equivalent compound it is understood that the relative quantity of the other components may need to be adjusted to optimize the formulation for a particular application or to enhance selected film characteristics. It should be appreciated that evaporation of diluents and/or solvents includes evaporation under ambient conditions as well as through application of heat and/or forced air.

By way of example, an initial vehicle (also referred to as a clear varnish) may be prepared as a constituent of the base layer 106, as well as of the pigmented ink layers 108, according to the following formulation scheme:

TABLE 1

Vehicle Formulation

| Component | % by weight | range |
|---|---|---|
| Thermoplastic polyester polyurethane based resin such as resins comprising diphenylmethane diisocyanate. | 25 | 20-30 |
| Solvent system comprising: | | |
| Ethyl 3 ethoxypropionate | 39 | 35-45 |
| Cyclohexanone | 19 | 15-25 |
| Diacetone alcohol | 17 | 15-25 |

To prepare the vehicle, the solvent system is first prepared by mixing the above solvents in an appropriate container. The resin is added to the solvents and the contents of the container are heated to the melting point of the resin, typically 100° F. to 140° F. The solvents and resin are stirred until the resin has melted and mixed thoroughly with the solvent. The sides of the container may be scraped while mixing to insure a homogeneous formulation.

The formulation of a clear base layer 106 may be prepared according to the following formulation scheme. Note that the base layer 106 formulation may be prepared essentially as unpigmented ink.

TABLE 2

Base Layer Formulation

| Component | % by weight | range |
|---|---|---|
| Vehicle (see above) | 92 | 85-95 |
| Resin flow modifier such as Modaflow produced by Solutia Inc. | 2 | 1.5-2.5 |
| UV absorbers such as substituted hydroxyphenyl-benzotriazoles, hydroxyphenyl-s-triazines, hydroxy-benzophenones and oxalic anilides, for example Tinuvin 1130 or Tinuvin 400. | 3 | 1-4 |
| Hindered amine light stabilizers such as those derived from 2,2,6,6-tetraalkyl piperidine, substituted piperizinedione, and/or decanedioic acid, for example Tinuvin 123. | 1 | 0.5-1.5 |
| A high molecular weight sterically hindered phenolic antioxidant such as: | | |
| Irganox 1010 | 1 | 0.5-1.5 |
| Irganox 1035 | 1 | 0.5-1.5 |

Note: Tinuvin 1130, Tinuvin 400, Tinuvin 123, Irganox 1010, and Irganox 1035 are produced by Ciba Specialty Chemicals Corporation.

Alternatively, a clear base layer 106 may be prepared without UV stabilizers and antioxidants as follows.

TABLE 3

Alternative Base Layer Formulation

| Component | % by weight | range |
|---|---|---|
| Vehicle (see above) | 98.5 | 97.5-100 |
| Resin flow modifier | 1.5 | 1.0-2.5 |

As an example of a pigmented ink 108, a black pigmented ink may be prepared according to the formula set forth in Table 4. For other colors, the percent of the selected pigment added may be modified as required to obtain the desired color and to increase or decrease opacity of the resultant ink.

TABLE 4

Pigmented Ink Formulation

| Component | % by weight | range |
| --- | --- | --- |
| Vehicle (see above) | 76.3 | 50-90 |
| Dibasic ester (solvent) | 5 | 3-8 |
| Black pigment | 7.2 | 5-8 |
| Resin flow modifier | 1.5 | 1.5-2.5 |
| Vehicle (see above) added as required up to approximately 10 % by weight to optimize viscosity and/or opacity. | 10 | 0-10 |

The solvent and pigment may be premixed with a smaller portion of the vehicle, such as 23% by weight, to aid in dispersion and solubilization or suspension of the pigment. Typically, the premix is transferred for grinding and dispersion of pigment in a three-roll mill. After the premix has been ground in the mill to form a relatively homogeneous dispersion with particulates in the range of 0 to 3 microns, the premix is removed from the mill and mixed with the remaining clear varnish.

The percentages given for the black pigment are not necessarily representative for other pigment colors. For example, when preparing a white ink it may be advantageous to add white pigment in the range of 30 to 50% of solids.

A top release coating or layer 110 may be applied over the ink layer 108. A release layer 110 formulation may be formulated according to the formula described in Table 3 for the alternative base layer to comprise 98.5% vehicle and 1.5% flow modifier. One or more additional components may be utilized to enhance release of the transfer medium, for example a release layer 110 formulation may comprise 95.55% weight vehicle as described in Table 1, 1.45% weight flow modifier (such as the Modaflow product described above) and 3.0% weight release and flow agent. An acceptable release and flow agent includes EFKA-7375 supplied by EFKA Additivies B.V., the Netherlands.

Once formulated, the release layer 110 may be applied over the ink layer or layers 108 and dried, or allowed to dry, to evaporate the diluent. The release layer 110 is typically applied via screen printing and is typically applied to extend beyond the margins of the ink 108 and base 106 layers. The release layer 100 increases the overall thickness of the decal 109 and enhances the handleability and dimensional stability of the decal 109. The transfer medium 104 may then be applied over the release layer 110, the release layer 110 remaining adhered to the ink layer 108 while enhancing release of the transfer medium 104 from the decal.

Descriptions of Vehicle, Base Layer and Ink Components

Polyurethane Resin

The above formulations include a thermoplastic polyester polyurethane as prepared in the vehicle formulation. Aliphatic polyurethanes such as polyester polyurethanes are advantageous as they exhibit greater stability in outdoor conditions because they tend to degrade less under exposure to weathering and UV light than aromatic polyurethanes. Linear polyurethanes such as those employing 4,4' diphenylmethane diisocyanate, 4,2' diphenylmethane diisocyanate and/or 2,2' diphenylmethane diisocyanate can be formulated to yield a thermoplastic polyester polyurethane with high flexibility and elongation characteristics. An appropriate commercial product includes Estane 5715 manufactured by Noveon, Inc.

UV Stabilizers

UV light can cause degradation and discoloration in ink films. UV light is absorbed by constituent polymers causing bond cleavage and release of free radicals leading to depolymerization. In some cases, excessive crosslinking also occurs causing embrittlement. Therefore, UV stabilizers such as UV absorbers and hindered amine light stabilizers have been added to the disclosed ink and base coat formulations to increase longevity of the decals during exposure to outdoor light and the high intensity UV radiation that may be used to cure photoreactive over-coatings such as clear coats. UV absorbers such as substituted hydroxyphenyl-benzotriazoles, hydroxyphenyl-s-triazines, hydroxybenzophenones and oxalic anilides may be added to the ink and base coat formulations. Examples of appropriate commercial products include Tinuvin 1130 and Tinuvin 400 produced by Ciba Specialty Chemicals Corporation.

Further protection from degradation due to UV radiation may be obtained through the addition of hindered amine light stabilizers (HALS) such as those derived from 2,2,6,6-tetraalkyl piperidine, substituted piperizinedione, and/or decanedioic acid. The HALS used with the above exemplary formulations comprises bis-(1-octyloxy-2,2,6,6-tetramethyl-4-piperidyl)-sebacate. Examples of appropriate commercial products include Tinuvin 123 produced by Ciba Specialty Chemicals Corporation.

Antioxidants

Antioxidants such phenolic based anti-oxidants are used to hinder oxidation of ink 108 and base coat 106 polymers and in particular are helpful to hinder thermally induced oxidation during exposure of the decal 109 to elevated temperatures. In addition to protecting the decal 109 during exposure to heat, the antioxidants suppress polymerization during curing at ambient temperatures thereby increasing the flexibility and elongation characteristics of the decal 109 as well as essentially eliminating shrinkage and associated problems in the prior art such as peeling and cracking. During baking of the substrate material, after transfer of the decal 109 and application of the clear over coat, the decal 109 softens due to its thermoplastic qualities and takes on properties of a resinous adhesive. At this time, the polymerization suppression of the antioxidants causes the ink 108 and base coat films 106 of the decal 109 to become tacky and to bind to one another, the substrate 101 and the clear coat. Once baking of the clear coat is completed and the substrate 101 is allowed to cool to ambient temperatures, the resultant finish comprises coatings that have substantially fused. Suitable phenolic antioxidants include 3,5-bis(1,1-dimethylethyl)-4-hydroxybenzene propanoic acid,2,2-bis[[3-[3,5-bis(1,1-dimethylethyl)-4-hydroxyphenyl]-1-oxopropoxy]methyl]1,3-propanediyl ester and benzenepropanoic acid, 3,5-bis(1,1-dimethylethyl)-4-hydroxy-,thiodi-2,1-ethanediyl ester. Suitable commercial antioxidant products for use in ink 108 and base coat 106 formulations include Irganox 1010 and Irganox 1035 produced by Ciba Specialty Chemicals Corporation.

Flow Agents/Modifiers

As indicated above, a flow modifier may be added to the base coat and ink formulations. Flow modifiers, such as Modaflow resin, enhance film properties by aiding in pigment dispersion, facilitating evaporation of solvents and release of entrained air, improving adhesion of the ink film 108 to the substrate 101 or prior ink coatings, including base coat 106, and reducing surface imperfections of the cured decal films 109.

Flow modifiers increase the surface wetting and flow characteristics of the ink as it is screened on to the substrate, enhancing the ink's ability to self level to the substrate surface and enabling the production of thinner decal films 109. Flow modifiers are typically added in the range of 0.1% to 2% of total resin solids but may be adjusted to levels outside of this range to optimize flow characteristics for a given ink formulation.

A solvent system comprising ethyl 3 ethoxypropionate, cyclohexanone, and diacetone alcohol in the ratio disclosed in Table 1 may be used in formulating the vehicle. Dibasic ester may be added to enhance formulation of a pigmented ink.

Pigments selected to impart color to an ink should be selected for compatibility with other ink components, in particular the polymer resin, and for other advantageous characteristics such as opacity, gloss, bleed resistance and resistance to thermal and light degradation. Examples of appropriate pigments for use in the disclosed ink formulations include pigments for liquid inks supplied by Sun Chemical Corporation such as red pigment, product No. 228-0013, and violet pigment, product No. 288-0022 which are disclosed in product literature as being heat fast to at least 500°.

Description of Transfer Medium Formulation

The transfer medium may be prepared according to the following formulation scheme:

TABLE 5

Transfer Medium Formulation

| Component | % by weight | range |
|---|---|---|
| Propylene glycol methyl ether acetate (solvent) | 40 | 25-50 |
| Propylene glycol methyl ether (solvent) | 17 | 10-25 |
| Diacetone alcohol | 10 | 5-15 |
| Resin flow modifier | 3 | 1-6 |
| Nitrocellulose | 10 | 5-15 |
| Polyvinyl acetate resin | 20 | 10-30 |

The transfer medium 104 is a film applied in liquid form over the base coat 106 and ink 108 layers. After drying, the transfer medium 104 enhances the handleability of the decal which would otherwise be quite thin and subject to folding over or wrinkling during transfer to the substrate 101. The transfer medium 104 is typically applied to form a thicker film than the individual ink 108 or base coat 106 films. The transfer medium 104 disclosed in Table 5 is a film comprised of polyvinyl acetate and nitrocellulose that are formulated in a solvent system comprising propylene glycol methyl ether acetate, propylene glycol methyl ether, and diacetone alcohol. These solvents are selected to solubilize and compatibilize the nitrocellulose and polyvinyl acetate. A flow modifier (such as the Modaflow product described above) is added primarily to enhance surface wetting and flow characteristics of the transfer medium formulation. The transfer medium 104 typically does not contain additives to enhance UV or thermal stability because it is removed after application of the decal 109 to the final substrate 101 and discarded.

Polyvinyl acetate, such as polyvinyl acetate beads from McGean, product no. ASB-516, are added to the transfer medium 104 as a binder and for improved adhesion to metal and plastic surfaces. Other advantageous characteristics imparted or enhanced by the addition of polyvinyl acetate to the formulation include thermoplasticity, flexibility, solubility in selected solvents, resistance to yellowing, glossiness, transparency, and resistance to oil, grease, and abrasion.

Nitrocellulose is a film forming polymer and enhances the ability of the transfer medium 104 to become a thin, strong film upon curing. In general, polyvinyl acetate enhances the elasticity of the transfer medium film 104, while nitrocellulose enhances the rigidity and strength of the transfer medium film 104.

An alternative embodiment of the transfer medium 104 may comprise a release agent for enhanced release and separation of the transfer medium 104 from the ink layer 108 or layers. This alternative transfer medium 104 may be prepared according to the following formulation scheme:

TABLE 6

Alternative Transfer Medium Formulation

| Component | % by weight | range |
|---|---|---|
| Acrylic methacrylate resin | 34.3 | 25-40 |
| Plasticizer | 10 | 7-12 |
| Release agent | 3 | 1-5 |
| Solvent system comprising: | | |
| Propylene glycol methyl ether acetate | 33 | 25-35 |
| Propylene glycol methyl ether | 12.2 | 10-15 |
| Diacetone alcohol | 7 | 5-10 |

The alternative transfer medium formulation described in Table 6 is comprised of an acrylic methacrylate resin, such as BR-201 (a butyl methacrylate thermoplastic acrylic resin) supplied by Dianal America, Inc., formulated in a solvent system comprising propylene glycol methyl ether acetate, propylene glycol methyl ether and diacetone alcohol. Typically, the solvent system is first prepared by transferring specified solvents or equivalents to an appropriate mixing vessel. A plasticizer and a release agent may then be added. An acceptable commercial plasticizer includes Paraplex G-60 supplied by The C.P. Hall Company. An acceptable release agent includes Additol VXL 6383 supplied by Signet Chemical Company. The solution is then heated to approximately 140° F. or typically at least to the resin melting point (BR-210 typically melts at temperatures from 110 to 120° F.). The resin is then added while mixing the solution and the resulting formulation is stirred until components are in solution and thoroughly mixed.

A further embodiment of the transfer medium 104 may be prepared according to the following formulation scheme:

TABLE 7

Alternative Transfer Medium Formulation

| Component | % by weight | range |
|---|---|---|
| Acrylic methacrylate resin | 28.48 | |
| Plasticizer | 8 | |
| Release agent | 3 | |
| Solvent system comprising: | | |
| Propylene glycol methyl ether acetate | 37.38 | |
| Propylene glycol methyl ether | 14.24 | |
| Diacetone alcohol | 8.9 | |

The alternative transfer medium formulation described in Table 7 is comprised of an acrylic methacrylate resin, such as BR-201 (a butyl methacrylate thermoplastic acrylic resin) supplied by Dianal America, Inc., formulated in a solvent system comprising propylene glycol methyl ether acetate, propylene glycol methyl ether and diacetone alcohol. Typically, the solvent system is first prepared by transferring specified solvents or equivalents to an appropriate mixing vessel. The release agent such as a silicone-free, fluorocarbon-modified polymer may then be added and the solution mixed. The solution is then heated to approximately 140° F.

or typically at least to the resin melting point (BR-210 typically melts at temperatures from 110 to 120° F.). The resin is then added while mixing the solution, as is the plasticizer. The resulting formulation is stirred until components are in solution and thoroughly mixed. An acceptable commercial plasticizer includes Paraplex G-60 supplied by The C.P. Hall Company. An acceptable release and flow agent includes EFKA-7375 supplied by EFKA Additives B.V., the Netherlands.

Yet a further embodiments of the transfer medium 104 may be prepared by adding 3% by weight of the release agent identified above as Additol VXL 6383 in accordance with the following formulation scheme:

TABLE 8

Alternative Transfer Medium Formulation

| Component | % by weight | range |
|---|---|---|
| Acrylic methacrylate resin | 27.52 | |
| Plasticizer | 8 | |
| Release agent (EFKA-7375) | 3 | |
| Release agent (Additol VXL 6383) | 3 | |
| Solvent system comprising: | | |
| Propylene glycol methyl ether acetate | 36.12 | |
| Propylene glycol methyl ether | 13.76 | |
| Diacetone alcohol | 8.6 | |

Dispersion of solids in the above formulations may be evaluated using a grind block or smear test. Preferably, mixing is performed until solids are tested as being under approximately 3 microns in size.

Decal Application/Transference of the Ink to a Substrate

Once formed, an ink transfer system 100 may be stored until needed. The decal 109 may be transferred to a final substrate 101, such as a pre-painted automotive body part, according to the method or steps set forth below.

First, the ink transfer system 100 is trimmed, if desired, to remove excess backing sheet 102 material. Generally, cutting or trimming of the transfer medium 104 should be avoided unless it extends sufficiently beyond the margins of the base coat 106 and ink layers 108 to allow removal of excess. Next, the ink transfer system 100 is soaked in water for several minutes, two or more minutes generally sufficing for relatively small decals. Extended periods of soaking should be avoided as the water soluble coating on the backing sheet 102 may dissolve sufficiently to cause the decal 109 and transfer medium 104 layers to fall away from the backing sheet 102.

Figure 6:
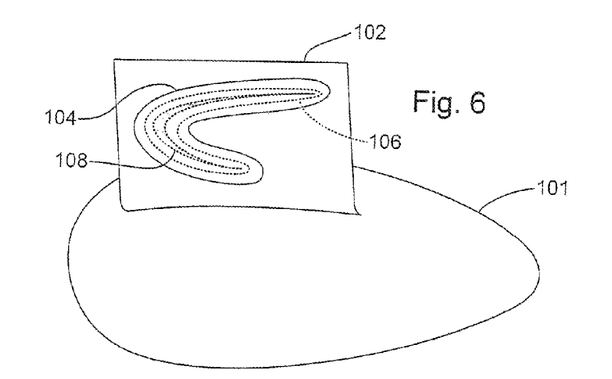
FIG. 6 is a top perspective view of a waterslide decal formed in the manner described herein, the edge of the backing sheet of the decal being positioned against a selected substrate prior to decal transfer.
Figure 7:
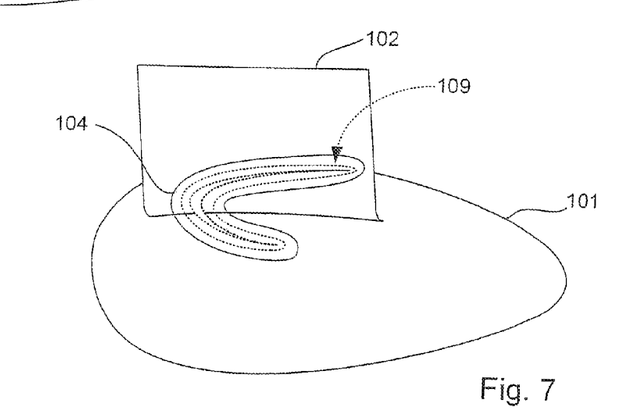
FIG. 7 is a top perspective view of a decal of FIG. 6 in which the decal has partially slid off of the backing sheet and onto the substrate surface.

FIG. 6 is a top perspective view of the lower edge of the backing sheet 102 positioned against a final substrate 101 with the ink transfer system 100 facing the viewer. The decal 109 including the attached transfer medium 104 is then slid off of the backing sheet 102. In FIG. 7, the decal 109 has been slid partially off of the backing sheet 102 and onto the surface of the substrate 101.

At this point, the decal 109 is held together by the strong adhesion of the base coat 106, ink layers 108, and release coat 110 to one another and the weaker, though sufficient, adhesion of the transfer medium 104 to the release coat 110. As indicated above, the transfer medium 104 is not composed of the same material as the ink 108 and, although flexible and capable of stretching, it is less so than the release coat 110, ink 108 and base coat 106 layers since it is designed to provide dimensional stability during transfer of the decal 109. For these purposes the transfer medium 104 is also typically screen printed or otherwise deposited to form a somewhat thicker layer.

The ink transfer decal 109 is applied to the substrate surface 101 with the transfer medium 104 on top and the base coat 106 contacting the substrate surface 101. Due to the moisture on the decal 109 (the substrate may also be prewetted, for example by spraying with water from a spray bottle or hose, not shown) and the thinness and flexibility of the decal 109, the surface tension of the water between the decal 109 and the substrate 101 causes the decal 109 to conform closely to the substrate surface 101 and to loosely adhere. At this point the decal 109 may be moved or adjusted to its final position, often determined by registration marks (not shown) on the substrate 101, and any wrinkles or bubbles may be smoothed out using a squeegee, sponge or other appropriate device.

Figure 8:
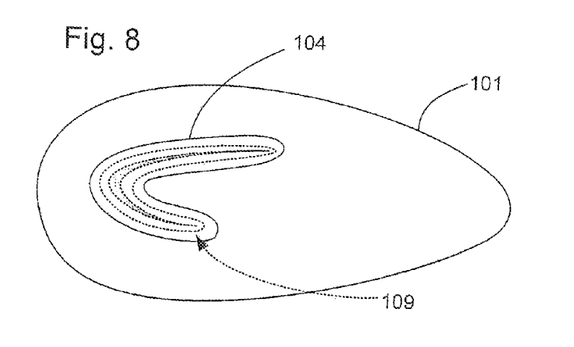
FIG. 8 is a top perspective view of the decal of FIGS. 6 and 7 in which the decal has been fully removed from the backing sheet and has been oriented in final position upon the substrate.

In FIG. 8, the decal 109 is shown fully removed from the backing sheet 102 and placed in final position upon the substrate surface 101. In FIGS. 6 through 7, the dashed lines defining the ink 108 and base coat 106 layers indicate that these layers are covered by and viewed through the transfer medium 104.

Because the ink 108 and base coats 106 are prepared from linear chain polyester polyurethanes, and polymerization is somewhat suppressed through use of antioxidants, the ink 108 and base coat 106 films of the decal 109 are extremely flexible and exhibit high elongation characteristics. Elongation of over 400% may be obtained when stretching the ink 108 and base coats 106. Because of these properties, the decal 109 may be applied to molded surfaces having irregular shapes. The transfer medium 104 allows for stretching and other manipulation of the decal 109 during application to the substrate 101 while aiding in handling of the decal 109 which would otherwise be difficult due to the extreme thinness of the ink 108 and base coat 106 layers. In other applications, the decal 109 may be transferred to a relatively flat surface for ease of registering and then subjected to considerable stretching and elongation due to bending or stamping of the piece post-transfer.

Figure 9:
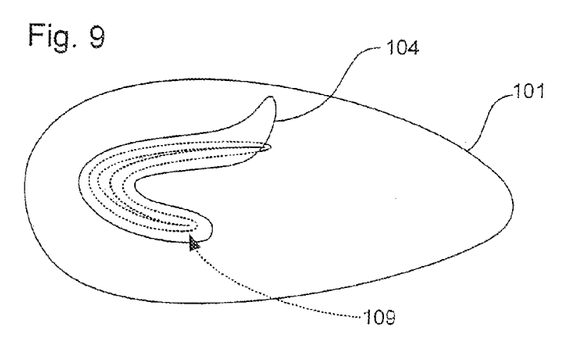
FIG. 9 is a top perspective view of the decal of FIGS. 6-8 in which the transfer medium has been partially peeled away from the decal and substrate surfaces.
Figure 10:
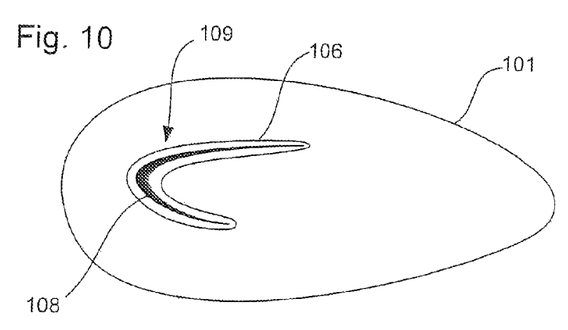
FIG. 10 is a top perspective view of the decal of FIGS. 6-9 in which the transfer medium has been fully removed and the decal and substrate are ready for application of a clear over coat.

The decal 109 is then allowed to dry through air drying or other means. After the decal 109 and transfer medium 104 dries and substantially all surface moisture has evaporated, typically 1 to 24 hours after transfer, the transfer medium 104 may be peeled away from the deposited decal 109. FIG. 9 provides a top perspective view of the decal 109 showing a portion of the transfer medium 104 peeled away from the decal 109 and substrate 101. Because it is removed after the water between the decal 109 and the substrate 101 has evaporated, it is important that the transfer layer 104 not stick or bind to the decal 109 excessively. FIG. 10 illustrates the decal 109 after removal of the transfer medium 104. At this point in the transfer process a clear base coat 106 may still be slightly visible or discernable from the surrounding surface of the substrate 101.

After 12 to 24 hours of air drying the water has typically evaporated from the decal 109 and substrate 101 completely and a clear coat may be applied. A commonly used, solvent-based, thermoset clear coat is typically applied by spraying. Such clear coatings often comprise thermoset polyurethanes that must go through a heat conversion to complete polymerization. Because of the extensive polymerization and crosslinking such coatings typically provide very good chemical resistance. As an alternative to a heat set system, a photoreactive (UV) coating may be applied.

Figure 11:
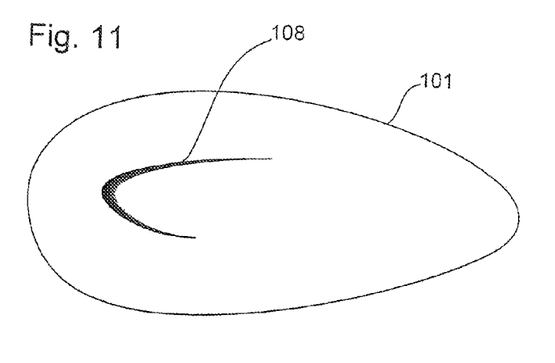
FIG. 11 is a top perspective view of the decal of FIGS. 6-10 after application of the clear over coat.

FIG. 11 is a top perspective view of the decal 109 after application of the clear coat and baking. At this point in the ink transfer process, the decal 109 has fused to the substrate 101 and clear coat and, due to the thinness of the base coat 106 and ink 108 layers, presents a design that does not protrude or project above the adjacent finish.

The substrate 101 bearing the decal 109 and overlying clear coat is then baked in an oven or otherwise heated to temperatures typically in the range of 250 to 325 degrees Fahrenheit. Due to the presence of antioxidants, the ink 108 and base coat 106 films may readily withstand exposure to such temperatures without degradation, discoloration, shrinkage, peeling or other defects. During the baking cycle the decal 109 softens becoming fluid or semi-fluid. While heated the decal 109 further polymerizes and adheres to compatible underlying surfaces such as typical polyurethane-based paints and coatings used in the automotive industry. The softening and adherence characteristics of the decal 109 are typically achieved as the temperature during the baking cycle rises to 185° F. and continue to improve as the temperature increases to 265° F. The decal 109 may be subjected to temperatures in excess of 375° F.

The ink film forming mechanism employed in the above ink embodiments is partially that of a solvent evaporation coating yielding a thermoplastic ink film. Film formation occurs during evaporation of the diluents and the concomitant coalescence of the polymer chains. Polymerization to form linear, polyester-based polyurethane chains yields an ink film having thermoplastic characteristics while still exhibiting good resistance to solvents and other chemicals after curing.

Addition of Free Isocyanates to Enhance Polymerization and Cross Linking

If further chemical resistance, more complete polymerization and/or enhanced abrasion resistance of the base coat 106 and ink layers 108 is desired, free isocyanates may be added to the ink formulation. Free isocyanates with particular advantages include aliphatic polyisocyanate resins based on hexamethylene diisocyanate. Such compounds react well with polyester hydroxyl-functional coreactants such as are used to prepare the vehicle described in Table 1. Resultant coatings prepared using polyisocyanate compounds exhibit enhanced resistance to solvents and oxidizing chemicals as well as increased abrasion resistance. The coatings have enhanced light stability, resistance to heat degradation and resist yellowing or other discoloration. A commercial product appropriate for providing free isocyanates with the above advantages includes Desmodur N 100, produced by Bayer Polymers LLC. Typically, these products are added to the ink formulation at levels of 0.005 to 0.01% of resin solids.

As a further embodiment, a thermal set ink transfer system may be provided through the addition to the ink 108 and base coat 106 formulations of melamine and an acid catalyst. The melamine reacts with the acid catalyst to form crosslinkings that set the film, reducing or eliminating thermoplasticity but increasing chemical and heat resistance.

It is to be understood that while certain forms of this invention have been illustrated and described, it is not limited thereto except insofar as such limitations are included in the following claims and allowable equivalents thereof.

I claim:

1. A method of creating and transferring a solid ink design to a substrate comprising the steps of:
    (a) providing a decal that does not include a separately applied adhesive, said decal comprising
        (i) a flexible backing sheet having a surface adapted to releaseably receive polymer resins,
        (ii) an ink transfer coating comprising one or more ink layers and, optionally, a transparent base coat, each of said one or more ink layers and optional base coat being printed onto said sheet as a liquid comprising a thermoplastic polymer resin, a UV stabilizer to inhibit photo degradation of polymers formed from said resin, an antioxidant to inhibit oxidative degradation of polymers formed from said resin, and a solvent system, said liquid from which any of said one or more ink layers and optional base coat are formed being capable of drying on said sheet by solvent evaporation upon being allowed to dry for one hour at ambient conditions, and
        (iii) a removable transfer medium coating deposited upon said dried ink transfer coating to form a film that will not strongly adhere to said ink transfer coating;
    (b) removing said flexible backing sheet from said decal to expose a surface of said ink transfer coating and applying said exposed surface to said substrate; and
    (c) stripping said transfer medium coating from said ink transfer coating with said ink transfer coating remaining on said substrate.

2. The method according to claim 1, said flexible backing sheet comprising water slide decal paper.

3. The method according to claim 2, step (b) including wetting said backing sheet prior to removing said backing sheet from said decal.

4. The method according to claim 3, step (b) including removing excess moisture from between said ink transfer coating and said substrate.

5. The method according to claim 4, step (b) including drying substantially all surface moisture from said decal.

6. The method according to claim 1, said ink transfer coating including an ink layer and a base coat.

7. The method according to claim 6, the margins of said ink layer being included entirely within the margins of said base coat.

8. The method according to claim 1, said method further comprising:
    (d) applying a clear coat over said substrate and said ink transfer coating after step (c) with no raised transition between said substrate and said ink transfer coating being perceptible to the touch or to the naked eye after said clear coat application.

9. The method according to claim 8, after step (d), baking said clear coat at a temperature of between 250 to 325° F. thereby fusing said ink transfer coating to said substrate and said clear coat.

10. The method according to claim 1, said substrate being a surface of a vehicle or vehicle accessory.

11. The method according to claim 10, said substrate being pre-painted prior to application of said decal.

12. The method according to claim 1, said substrate being a flat surface.

13. The method according to claim 12, further comprising:
    (e) bending, stamping or otherwise shaping said substrate surface after application of said decal thereby causing said ink transfer coating to stretch and elongate without cracking.

14. The method according to claim 1, said surface being a contoured surface.

15. The method according to claim 14, further comprising:
    (f) stretching said decal over said contoured surface after removing said backing sheet without wrinkling or damaging the decal.

16. A method of creating and transferring a solid ink design to a substrate comprising the steps of:
    (a) creating a decal that does not include a separately applied adhesive by
        (i) applying an ink transfer coating comprising one or more ink layers and, optionally, a transparent base coat to a flexible backing sheet having a surface adapted to releasably receive polymer resins, each of said one or more ink layers and optional base coat being printed onto said sheet as a liquid comprising a thermoplastic polymer resin, a UV stabilizer to inhibit photo degradation of polymers formed from said resin, an antioxidant to inhibit oxidative degradation of polymers formed from said resin, and a solvent system, each of said one or more ink layers and optional base coat capable of drying on said sheet by solvent evaporation upon being allowed to dry for one hour at ambient conditions, and (iii) depositing a removable transfer medium coating upon said dried ink transfer coating to form a film that will not strongly adhere to said ink transfer coating;

(b) removing said flexible backing sheet from said decal to expose a surface of said ink transfer coating and applying said exposed surface to said substrate; and (c) stripping said transfer medium coating from said ink transfer coating with said ink transfer coating remaining on said substrate.

17. The method according to claim 16, said ink transfer coating including an ink layer and a base coat.

18. The method according to claim 16, the margins of said ink layer being included entirely within the margins of said base coat.

19. The method according to claim 16, further comprising:

(d) applying a clear coat over said substrate and said ink transfer coating with no raised transition between said substrate and said ink transfer coating being perceptible to the touch or to the naked eye after said clear coat application.

20. The method according to claim 16, said substrate being a surface of a vehicle or vehicle accessory.

21. The method according to claim 20, said substrate being pre-painted prior to application of said decal.

22. The method according to claim 16, said substrate being a flat surface.

23. The method according to claim 22, further comprising:

(e) bending, stamping or otherwise shaping said substrate surface after application of said decal thereby causing said ink transfer coating to stretch and elongate without cracking.

24. The method according to claim 16, said surface being a contoured surface.

25. The method according to claim 24, further comprising:

(f) stretching said decal over said contoured surface after removing said backing sheet without wrinkling or damaging the decal.

26. The method according to claim 19, after step (d), baking said clear coat at a temperature of between 250 to 325° F. thereby fusing said ink transfer coating to said substrate and said clear coat.

27. The method according to claim 16, said flexible backing sheet being water slide decal paper.

* * * * *